(No Model.)
E. H. TALIAFERRO.
SWINGING CHURN.
No. 425,915. Patented Apr. 15, 1890.
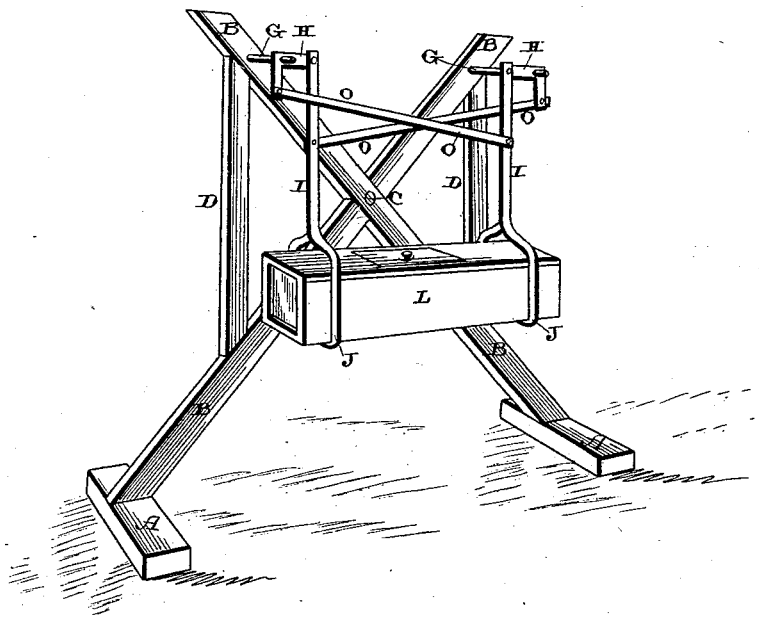
Witnesses:
E. P. Ellis
L. J. Magie
Inventor
E. H. Taliaferro
per F. A. Lehmann, atty.

UNITED STATES PATENT OFFICE.

EILBECK HUNTER TALIAFERRO, OF ATLANTA, GEORGIA, ASSIGNOR, BY DIRECT AND MESNE ASSIGNMENTS, TO J. L. C. KERR AND J. L. DICKEY, OF SAME PLACE.

SWINGING CHURN.

SPECIFICATION forming part of Letters Patent No. 425,915, dated April 15, 1890.

Application filed November 5, 1889. Serial No. 329,294. (No model.)

*To all whom it may concern:*

Be it known that I, EILBECK HUNTER TALIAFERRO, of Atlanta, in the county of Fulton and State of Georgia, have invented certain new and useful Improvements in Swinging Churns; and I do hereby declare the following to be a full, clear, and exact description of the invention, such as will enable others skilled in the art to which it pertains to make and use it, reference being had to the accompanying drawing, which forms part of this specification.

My invention relates to an improvement in swinging churns; and it consists in the combination and arrangement of parts, to be more fully described hereinafter, and particularly pointed out in the claim.

The object of my invention is to produce a swinging churn in which the churn-body is not only given a swinging but a tilting motion at the same time, so as to throw the cream with greater violence from one end of the box to the other, so as to more perfectly break up the butter-globules, and thus cause the butter to be made in much less time than can be done with the mere swinging body alone.

The accompanying drawing represents a perspective of a churn which embodies my invention.

A represents two base-pieces, to which the lower ends of the inclined standards B are fastened. These standards cross each other, as shown, in the form of a letter X, and are securely fastened together at C, and are then braced by the braces D. Extending horizontally outward from the upper ends of the standards D are the supports or bearings G, upon which the bell-cranks H are pivoted. To the inner ends of the bell-cranks are fastened the suspending-rods I, which have their lower ends formed into loops J, inside of which the churn-body L is placed and fastened in any suitable manner. These loops are higher than the body of the churn, so as to allow the body to have a tilting as well as a mere swinging movement. To the lower outer ends of the bell-cranks H are fastened the connecting-rods O, which cross each other and have their opposite ends pivoted to the suspension-rods I. These rods O, together with the bell-cranks, cause the body to have a downward-tilting movement as well as a swinging movement, and by alternately depressing the ends of the churn cause the cream to be thrown from one end of the churn to the other with greater force than can be done by a mere swinging motion alone.

If the rods O were not used, the churn-body would simply swing back and forth; but by the use of the rods O one end of the churn is made to swing or tilt downward while the opposite end is raised, thus increasing the velocity of the movement of the cream and causing a more speedy separation of the butter from the milk. If the churn is made to swing alone, the cream is forced from one end of the body to the other in gentle waves, thus causing but a very slight breaking of the butter-globules and requiring a much longer time for the separation of the butter.

While the arrangement here shown is thought to be the most preferable, I do not limit myself to any particular arrangement of parts, for these may be varied at will without departing from the spirit of my invention.

Having thus described my invention, I claim—

In a swinging churn, the combination of a suitable support, the bell-cranks pivoted thereon, suspension-rods attached to one arm of each of the bell-cranks, cross-rods pivotally attached at one end to the other arm of each of the bell-cranks and also pivotally connected to the suspension-rods, and a churn-body supported by the suspension-rods, all as shown and described.

In testimony whereof I affix my signature in presence of two witnesses.

EILBECK HUNTER TALIAFERRO.

Witnesses:
 J. L. C. KERR,
 H. FRANKLYN STARKE.